March 24, 1931. W. WESTLING 1,797,458
RADIUS ROD BUSHING
Filed Dec. 11, 1929
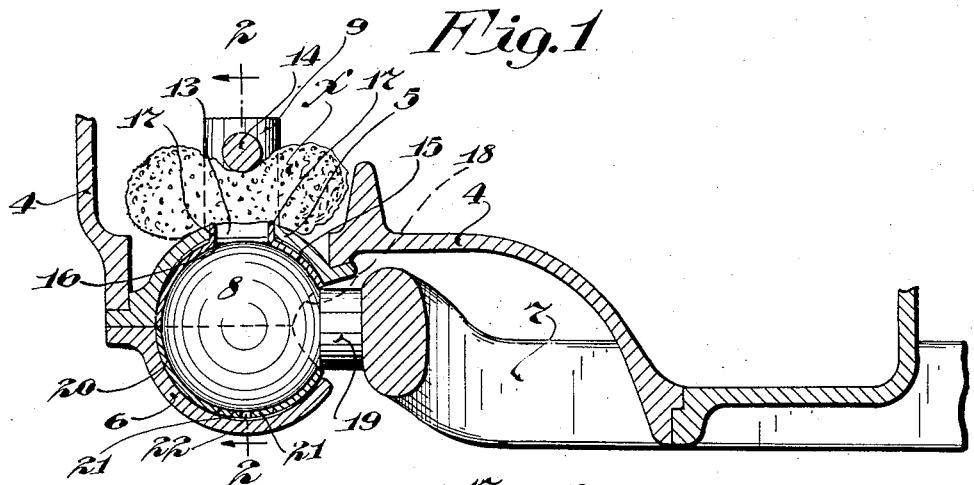
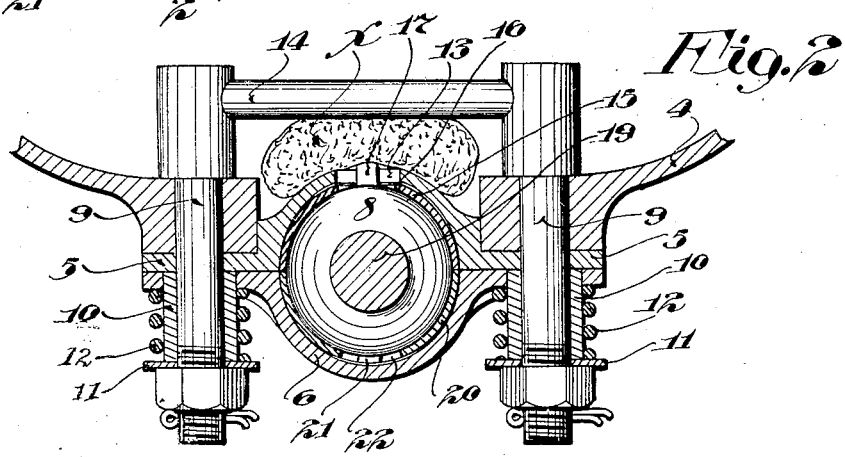
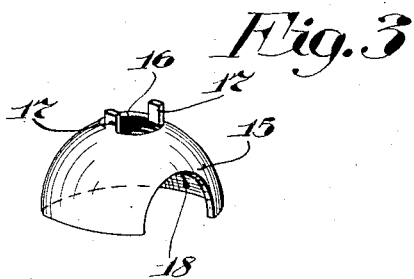
Inventor
William Westling
By his Attorneys
Merchant and Kilgore Patented Mar. 24, 1931

1,797,458

UNITED STATES PATENT OFFICE

WILLIAM WESTLING, OF MINNEAPOLIS, MINNESOTA

RADIUS-ROD BUSHING

Application filed December 11, 1929. Serial No. 413,406.

My invention has for its object the provision of an extremely simple and highly efficient bushing intended for general use but especially well adapted for use in connection with a ball and socket joint and more particularly of the Ford radius rod type.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a sectional view showing the improved bushing applied to the front radius rod ball, socket and cap of a Ford automobile;

Fig. 2 is a view partly in elevation and partly in section taken on the line 2—2 of Fig. 1; and Fig. 3 is a perspective view of one of the bushings.

Of the parts of the Ford automobile illustrated, 4 indicates the transmission case, 5 the radius rod ball socket and 6 the cap therefore, 7 the radius rod, 8 the radius rod ball, 9 the nut-equipped bolts, 10 the sleeves, 11 the washer, and 12 the springs. The socket 5 is fitted in an aperture in the transmission case 4 and rigidly held in place by the nut-equipped bolts 9 and sleeves 10 and the springs 12 yieldingly hold the cap 6 in place.

In the top of the socket 5 is an oil hole 13 through which oil may be discharged into the ball and socket joint to lubricate the same. An absorbent material X is placed over the oil hole 13 in the socket 5, is held in place by the tie-rod 14 which connects the two bolts 9.

The improved bushing, as shown, is in the form of a hemispherical shell 15 having at its axis an aperture 16 and having at said aperture a pair of diametrically opposite outwardly projecting yielding retaining fingers 17 cut and pressed from said shell when forming the aperture 16. A notch 18 is formed in the shell 15 to afford clearance for the neck 19 which connects the ball 8 to the radius rod 7. The bushing 15 is snugly fitted in the socket 5 with its retaining fingers 17 extending into the oil hole 13 and frictionally engaging said socket to hold the bushing with its axis coincident with the axis of the socket 5 and its oil hole 13. These retaining fingers 17 positively hold the bushing 15 against angular tilting movement in the socket 5.

A second bushing 20, identical with the bushing 15, is snugly fitted in the cap 6 and its retaining finger 21, which are not required, are bent into the aperture 22.

After initial wear between the ball and socket joint takes place the bushing 15 is mounted in the socket 5 by inserting the same therein with sufficient force to cause the retaining fingers 17 to slightly yield as they enter the oil hole 13 and thereby frictionally hold the bushing 15 in place. This friction engagement of the fingers 17 with the socket 5 holds the bushing 15 in place while the ball 8 is being applied in the socket 5. The primary object of the retaining fingers 17 is to prevent turning movement of the bushing 15 from the socket 5 into the cap 6 under the action of the ball 8. The reason of first placing the bushing 15 in the socket 5 is to cause the socket 5, which is rigidly seated in an aperture in the transmission case 4, to take the end thrust of the radius rod 7 and thereby relieve the bolts 9 from such strain.

If it were not for the retaining fingers 17 the bushing 15 would turn from the socket 5 into the cap 6 and thereby transfer the end thrust of the radius rod 7 from the rigidly held socket 5 to the cap 6 and thereby place this strain on the bolts 9.

When further wear takes place in the ball and socket joint the bushing 20, which is identical with the bushing 15, is placed in said cap and together with the bushing 15 from a sphere which encircles the ball 8. Before placing the bushing 20 in the cap 6 the retaining fingers 17 are bent into the aperture 22 so as to not interfere with the mounting of the bushing 20 in the cap 6.

The above described bushing or two thereof, depending on the amount of wear to be taken up, may be very quickly applied in a ball and socket joint. The two bushings illustrated are, as previously stated, identical the one with the other, and are given different identifying characters simply to distinguish the same from each other as to the positions in which they occupy in the ball and socket joint. While the retaining fingers on the bushing 20 are not required it is a very easy matter to bend the same into the aperture in the bushing at the time said bushing is to be applied to a cap. By providing a bushing that can be used either in the socket or cap of a ball and socket joint makes it necessary to carry only one form of bushing in stock and simplifies the work of a mechanic in applying the same for the reason that the bushings are all of the same type.

What I claim is:

The combination with a radius rod ball socket having at its axis an oil hole, of a substantially hemispherical bushing fitted in said socket and also having a pair of diametrically opposite yielding retaining fingers extending into the oil hole and frictionally engaging the socket at diametrically opposite points.

In testimony whereof I affix my signature.

WILLIAM WESTLING.